United States Patent
Taherzadeh Boroujeni et al.

(10) Patent No.: US 11,785,625 B2
(45) Date of Patent: Oct. 10, 2023

(54) DOWNLINK CONTROL INFORMATION (DCI) ON PHYSICAL DOWNLINK SHARED CHANNEL (PDSCH)

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jelena Damnjanovic, Del Mar, CA (US); Sony Akkarakaran, Poway, CA (US); Juan Montojo, San Diego, CA (US); Iyab Issam Sakhnini, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 81 days.

(21) Appl. No.: 17/216,464

(22) Filed: Mar. 29, 2021

(65) Prior Publication Data

US 2021/0307015 A1 Sep. 30, 2021

Related U.S. Application Data

(60) Provisional application No. 63/002,985, filed on Mar. 31, 2020.

(51) Int. Cl.
| | |
|---|---|
| *H04W 4/00* | (2018.01) |
| *H04W 72/53* | (2023.01) |
| *H04W 72/0446* | (2023.01) |
| *H04L 1/00* | (2006.01) |
| *H04W 80/02* | (2009.01) |
| *H04W 72/0453* | (2023.01) |
| *H04W 72/23* | (2023.01) |

(52) U.S. Cl.
CPC ........... *H04W 72/53* (2023.01); *H04L 1/0004* (2013.01); *H04L 1/0063* (2013.01); *H04W 72/0446* (2013.01); *H04W 72/0453* (2013.01); *H04W 72/23* (2023.01); *H04W 80/02* (2013.01)

(58) Field of Classification Search
None
See application file for complete search history.

(56) References Cited

U.S. PATENT DOCUMENTS

| | | | |
|---|---|---|---|
| 2017/0223687 A1 | 8/2017 | Kuchibhotla et al. | |
| 2018/0048994 A1* | 2/2018 | Kwon | H04W 72/1263 |
| 2018/0092070 A1* | 3/2018 | Liao | H04L 5/0094 |

(Continued)

OTHER PUBLICATIONS

International Search Report and Written Opinion—PCT/US2021/024853—ISA/EPO—dated Jul. 14, 2021.

*Primary Examiner* — Zewdu A Beyen
(74) *Attorney, Agent, or Firm* — Qualcomm/Norton Rose Fulbright US LLP

(57) ABSTRACT

This disclosure provides systems, methods, and apparatuses, including computer programs encoded on computer storage media, for wireless communication. In one aspect of the disclosure, a method of wireless communication performed by a user equipment (UE) includes receiving, from a network entity, a physical downlink shared channel (PDSCH) that includes downlink control information (DCI) and that does not include any media access control (MAC) header. The method further includes processing the DCI based on the PDSCH not including any MAC header. Other aspects and features are also claimed and described.

28 Claims, 6 Drawing Sheets

(56) References Cited

U.S. PATENT DOCUMENTS

2019/0261217 A1    8/2019  Nammi et al.
2020/0015202 A1    1/2020  Khoshnevisan et al.
2020/0275482 A1*   8/2020  Oh ........................ H04W 74/08
2021/0352638 A1*   11/2021 Yi ......................... H04L 5/0055

* cited by examiner

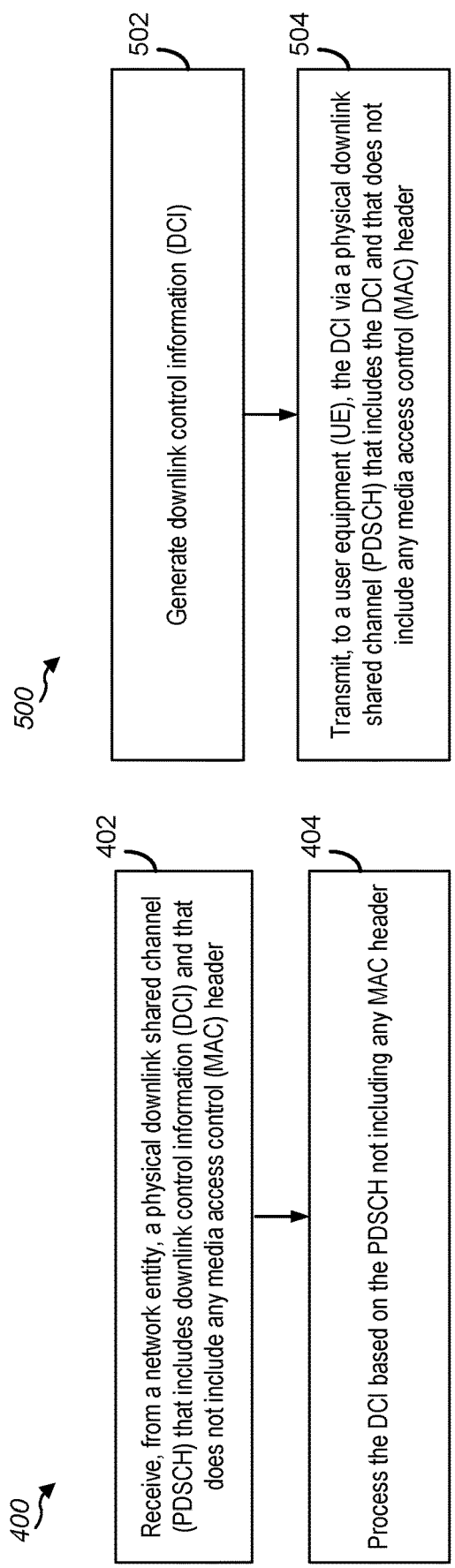

DOWNLINK CONTROL INFORMATION (DCI) ON PHYSICAL DOWNLINK SHARED CHANNEL (PDSCH)

CROSS-REFERENCE TO RELATED APPLICATIONS

This application claims the benefit of U.S. Provisional Patent Application No. 63/002,985, entitled, "DOWNLINK CONTROL INFORMATION (DCI) ON PHYSICAL DOWNLINK SHARED CHANNEL (PDSCH)," filed on Mar. 31, 2020, which is expressly incorporated by reference herein in its entirety.

TECHNICAL FIELD

Aspects of the present disclosure relate generally to wireless communication systems, and more particularly, to the transmission of downlink control information (DCI) via a physical downlink shared channel (PDSCH).

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

One technique used by at least some 5G wireless communication systems is the communication of control information and data via millimeter-wave communications. Millimeter-wave typically refers to the band in the communication spectrum between 30 gigahertz (GHz) and 300 GHz. Millimeter-wave communications enable 5G wireless communication systems to have expanded capacity, as compared to 4G wireless communication systems. In 5G communication systems, control information and data are communicated between base stations and UEs via a variety of channels. Channels may refer to time resources, such as time blocks, frequency resources, such as frequency bands or subbands, or both, that are used by the base stations and UEs to perform wireless communications. As an example, control information is typically communicated from a base station to a UE via a physical downlink control channel (PDCCH), and data is typically communicated from a base station to a UE via a physical downlink shared channel (PDSCH). Additional channels may be used for uplink communications from the UE to the base station. Another type of channel used for communication between the UE and the base station is a random access channel (RACH). UEs typically transmit messages to the base station via the RACH to gain access to the network, such as to schedule calls or for bursty data transmissions.

To enable access to the network, the base station or other network entity may transmit, to a UE, a master information block (MIB) that includes a first portion of information used to access the network. The remaining portions of the information may be included in one or more remaining minimum system information (RMSI) messages that are transmitted from the base station to the UE. RMSI messages in 5G communication systems may be similar to system information blocks (SIBS) SIB1 and SIB2 in LTE communication systems.

As research into millimeter-wave communications continues in 5G wireless communication systems, two sources of potential bottleneck are "msg2" messages and RMSI messages which are transmitted via a PDCCH. As used herein, a msg2 is a particular message transmitted from a base station to a UE during an initial or random access procedure. One reason for the limited coverage of msg2 and RMSI messages is that these messages are configured to be transmitted in a control resource set (CORESET) and cannot be more than three symbols, typically not more than two symbols. Another reason for the limited coverage of the msg2 and RMSI messages is that wide broadcast beams are used during the initial and random access procedures, and these broadcast beams may not provide sufficient gain for communication of the msg2 and RMSI messages to at least some UEs at the edge of a coverage area. In LTE and 5G NR, a medium access control (MAC) control element (CE) may be used to transmit control information, such as downlink control information (DCI), to a UE as part of a payload of a data transport block (TB). The TB may be transmitted via a PDSCH that corresponds to a narrower communication beam that provides a higher gain than the wide broadcast beams used during the initial and random access procedures. However, the PDSCH is scheduled (or activated in the case of semi-persistent scheduling (SPS)) by a message transmitted via the PDCCH, which may have limited coverage as described above. In addition to the coverage issues associated with scheduling the PDSCH, including DCI as a payload of a TB that is transmitted via the PDSCH can degrade throughput of wireless communication systems. To illustrate, a TB that includes DCI also always includes a MAC header. The purpose of such a MAC header is to indicate source and destination MAC information, as well as to distinguish the data following the MAC header as DL data. Including a MAC header in the TB uses additional bits as compared to a TB that does not include DCI and a MAC header, and the additional bits decrease throughput and increase overhead in wireless communication systems.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a user equipment (UE). The method includes receiving, from a network entity, a physical downlink shared channel (PDSCH) that includes downlink control information (DCI) and that does not include any media access control (MAC) header. The method further includes processing the DCI based on the PDSCH not including any MAC header.

Another innovative aspect of the subject matter described in this disclosure can be implemented in a UE. The UE includes at least one processor and a memory coupled with the at least one processor and storing processor-readable instructions that, when executed by the at least one processor, is configured to receive, from a network entity, a PDSCH that includes DCI and that does not include any MAC header. The at least one processor is further configured to process the DCI based on the PDSCH not including any MAC header.

Another innovative aspect of the subject matter described in this disclosure can be implemented in an apparatus configured for wireless communication. The apparatus includes means for receiving, at a UE from a network entity, a PDSCH that includes DCI and that does not include any MAC header. The apparatus further includes means for processing the DCI based on the PDSCH not including any MAC header.

Another innovative aspect of the subject matter described in this disclosure can be implemented in a non-transitory computer-readable medium storing instructions that, when executed by a processor, cause the processor to perform operations including receiving, at a UE from a network entity, a PDSCH that includes DCI and that does not include any MAC header. The operations further include processing the DCI based on the PDSCH not including any MAC header.

Another innovative aspect of the subject matter described in this disclosure can be implemented in a method of wireless communication performed by a network entity. The method includes generating DCI. The method further includes transmitting, to a UE, a PDSCH that includes the DCI and that does not include any MAC header.

Another innovative aspect of the subject matter described in this disclosure can be implemented in a network entity. The network entity includes at least one processor and a memory coupled with the at least one processor and storing processor-readable code that, when executed by the processor, is configured to generate DCI. The at least one processor is further configured to initiate transmission, to a UE, of a PDSCH that includes the DCI and that does not include any MAC header.

Another innovative aspect of the subject matter described in this disclosure can be implemented in an apparatus configured for wireless communication. The apparatus includes means for generating DCI at a network entity. The apparatus further includes means for transmitting, to a UE, a PDSCH that includes the DCI and that does not include any MAC header.

Another innovative aspect of the subject matter described in this disclosure can be implemented in a non-transitory computer-readable medium storing instructions that, when executed by a processor, cause the processor to perform operations including generating DCI at a network entity. The operations further include initiating transmission, to a UE, of a PDSCH that includes the DCI and that does not include any MAC header.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a flow diagram illustrating an example process performed by a UE that supports receiving a PDSCH that includes DCI and that does not include any media access control (MAC) header according to one or more aspects.

FIG. 5 is a flow diagram illustrating an example process performed by a network entity that supports transmitting a PDSCH that includes DCI and that does not include any MAC header according to one or more aspects.

Like reference numbers and designations in the various drawings indicate like elements.

DETAILED DESCRIPTION

Figure 1:
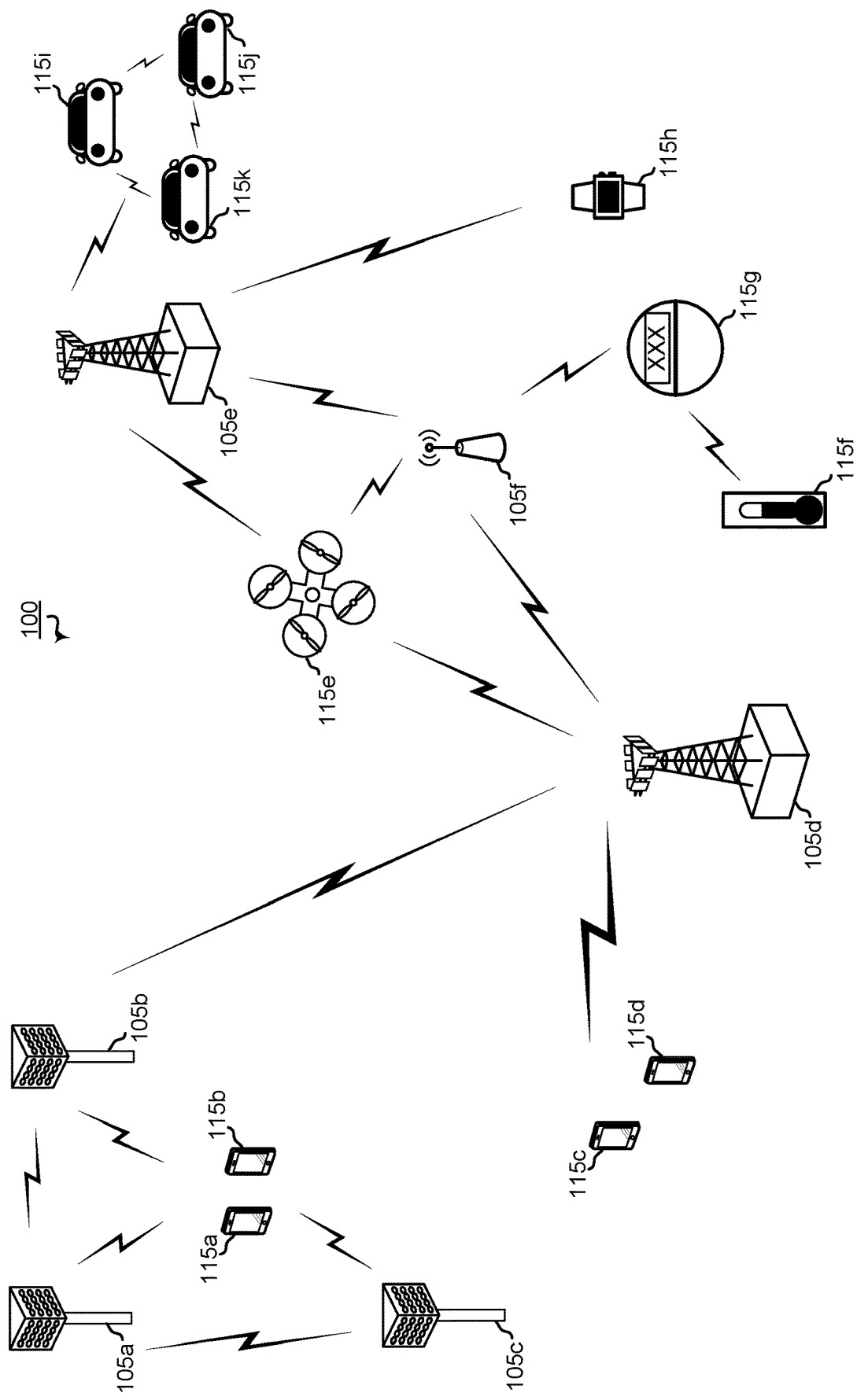
FIG. 1 is a block diagram illustrating details of an example wireless communication system according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The electromagnetic spectrum is often subdivided, based on frequency (or wavelength), into various classes, bands or channels. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band (or spectrum) in documents and articles, despite being different than the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The present disclosure provides systems, apparatus, methods, and computer-readable media for enabling a network entity, such as a base station, to provide control information, such as downlink control information (DCI), to a user equipment (UE) via a physical downlink shared channel (PDSCH) instead of via a physical downlink control channel (PDCCH). In various aspects, the network entity transmits the DCI without (also referred to herein as "independently of") a media access control (MAC) header. For example, the DCI may be included in a MAC control element (CE) that does not include any MAC header and that is transmitted via the PDSCH. Such a MAC CE that does not include any MAC header may be referred to herein as a compact downlink command, a compact MAC CE, or a "skinny" MAC CE. In some implementations, a network entity may transmit a compact downlink command via a PDSCH as a substitute for transmitting a msg2 PDCCH (or a msgB PDCCH) that would typically include DCI scheduling a msg2 (or msgB) data transmission via the PDSCH. For example, instead of first transmitting a msg2 PDCCH, such as in response to receiving a msg1 from a UE, followed by transmitting a PDSCH that includes data, a network entity may instead transmit a PDSCH that includes a compact downlink command, such as a MAC-CE that includes DCI and no MAC header, that schedules transmission of one or more data transport blocks (TBs) in the PDSCH, or one or more other PDSCHs. Additionally, or alternatively, the network entity may transmit a compact downlink command via a PDSCH as a substitute for transmitting a remaining minimum system information (RMSI) PDCCH that would typically include DCI scheduling an RMSI data transmission via a PDSCH, similar to as described above for the msg 2 PDCCH or msgB PDCCH.

Particular implementations of the subject matter described in this disclosure can be implemented to realize one or more of the following potential advantages. In some aspects, the present disclosure provides a process and techniques for transmitting DCI via a PDSCH such as via a MAC CE that does not include any MAC header. Transmitting DCI in this manner may improve the coverage of the DCI and may reduce a bottleneck for millimeter-wave communications. For example, the DCI may be transmitted via the PDSCH using a narrower communication beam (as compared to the PDCCH) that provides a higher gain, which may enable more UEs, such as UEs at an edge of a coverage area, to receive the DCI than if the DCI is transmitted via the PDCCH (thereby increasing coverage of the DCI). Additionally, by communicating the DCI without any MAC header and with downlink data via the PDSCH, instead of communicating the DCI separately in the PDCCH, throughput may be increased and overhead may be decreased in a wireless communication system.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS/GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes/km2), ultra-low complexity (such as ~10s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as 99.9999% reliability), ultra-low latency (such as ~1 millisecond (ms)), and users with wide ranges of mobility or lack thereof; and (3) with enhanced mobile broadband including extreme high capacity (such as ~10 Tbps/km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system according to one or more aspects. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device to device or peer to peer or ad hoc network arrangements, etc. The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (such as MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD/FDD communications, such as in a vehicle-to-vehicle (V2V) mesh network between the UEs 115i-115k communicating with the macro base station 105e.

Figure 2:
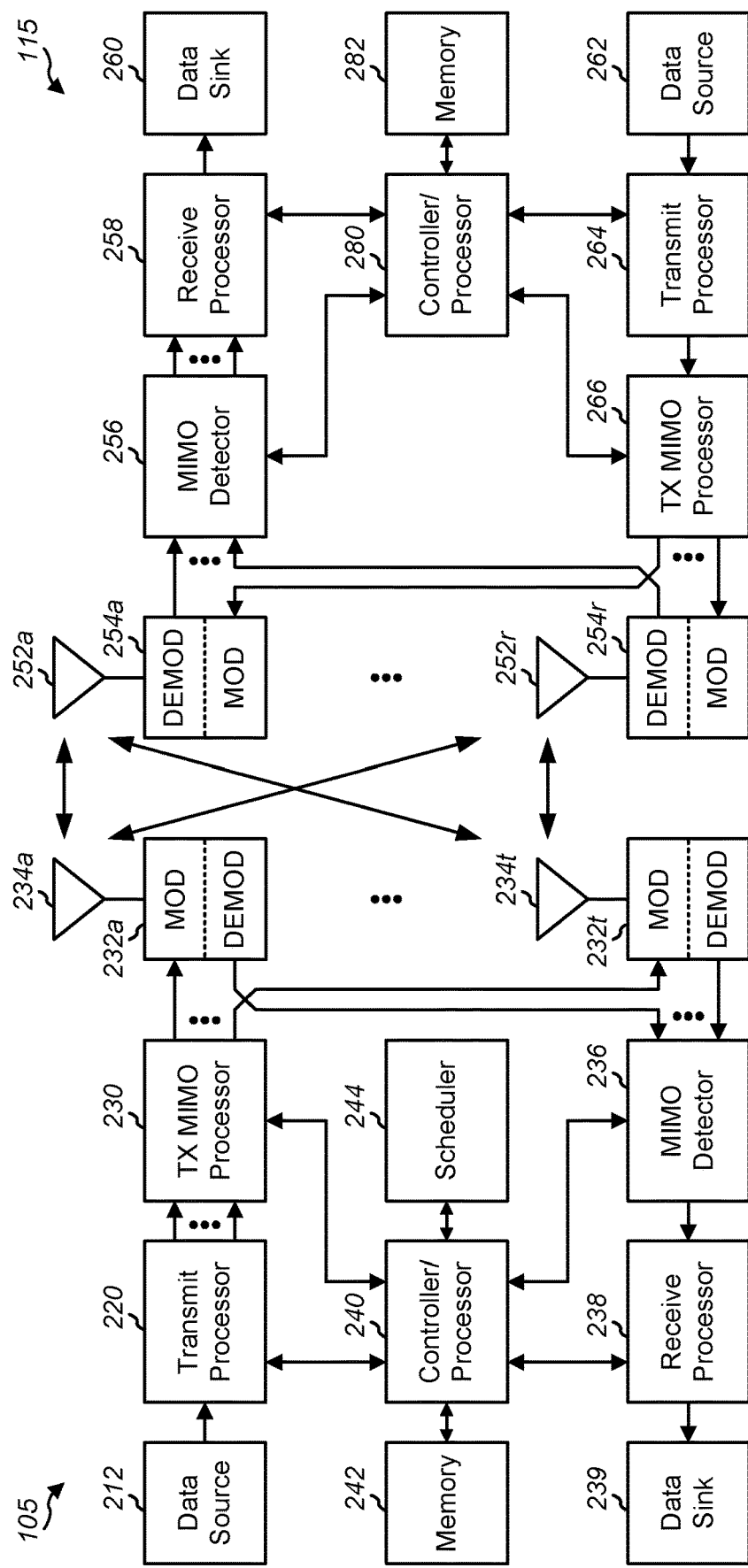
FIG. 2 is a block diagram illustrating examples of a base station and a user equipment (UE) according to one or more aspects.

FIG. 2 is a block diagram illustrating examples of a base station 105 and a UE 115 according to one or more aspects. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, etc., to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, etc., to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller/processor 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller/processor 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, etc.), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller/processor 240.

The controllers/processors 240 and 280 may direct the operation at the base station 105 and the UE 115, respectively. The controller/processor 240 or other processors and modules at the base station 105 or the controller/processor 280 or other processors and modules at the UE 115 may perform or direct the execution of various processes for the techniques described herein, such as to perform or direct the execution illustrated in FIGS. 3-7, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge/negative-acknowledge (ACK/NACK) feedback for its own transmitted packets as a proxy for collisions.

Figure 3:
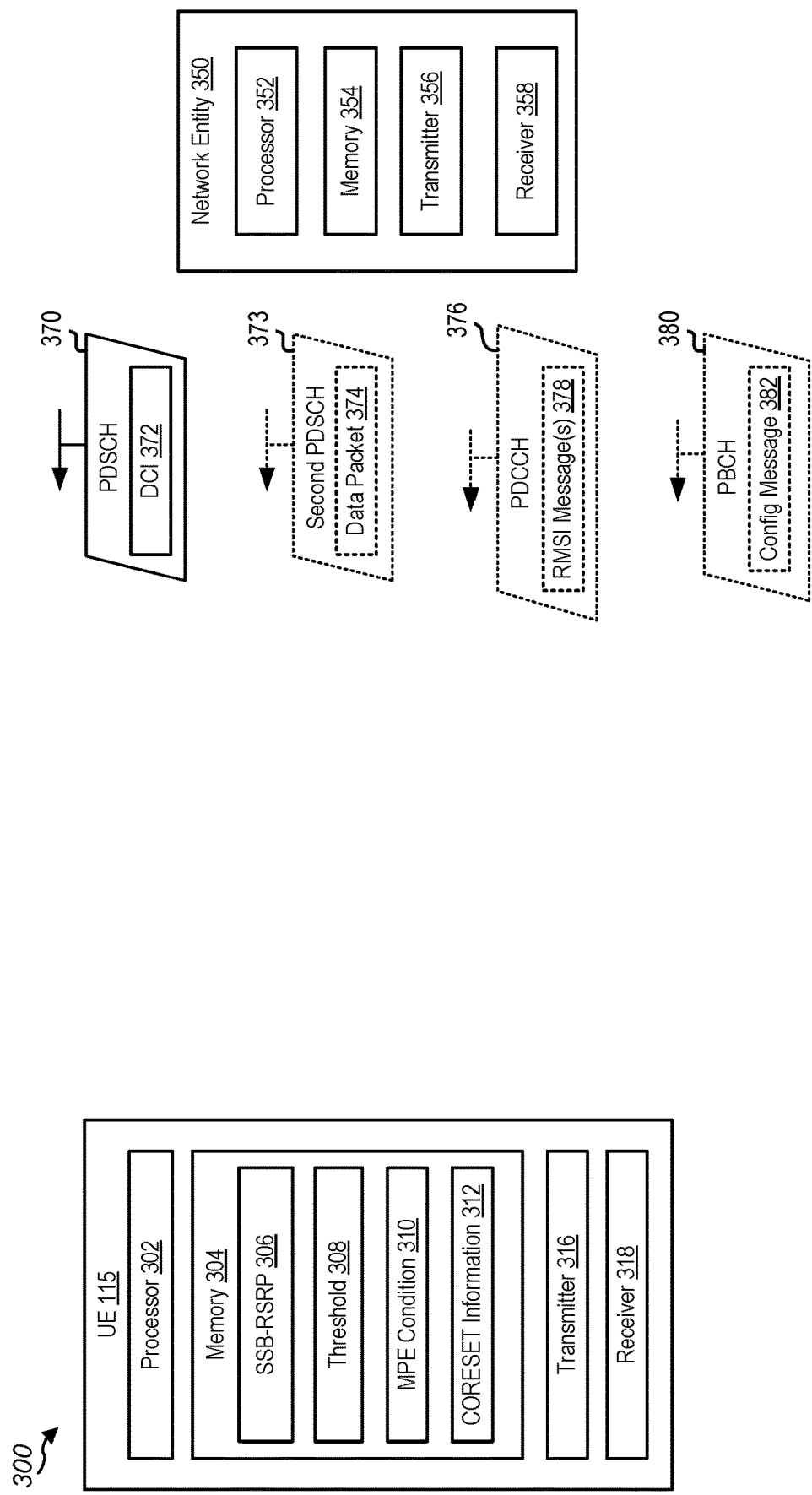
FIG. 3 is a block diagram illustrating an example wireless communication system that supports communicating downlink control information (DCI) via a physical downlink shared channel (PDSCH) according to one or more aspects.

FIG. 3 is a block diagram illustrating an example wireless communications system 300 that supports communicating DCI via a PDSCH according to one or more aspects. In some examples, the wireless communications system 300 may implement aspects of the wireless network 100. The wireless communications system 300 includes the UE 115 and a network entity 350. The network entity 350 may include or correspond to the base station 105, a network, a network core, or another network device, as illustrative, non-limiting examples. Although one UE and one network entity are illustrated, in some other implementations, the wireless communications system 300 may generally include multiple UEs, and may include more than one network entity.

The UE 115 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 316 (hereinafter referred to collectively as "the transmitter 316"), and one or more receivers 318 (hereinafter referred to collectively as "the receiver 318"). The processor 302 may be configured to execute instructions stored in the memory 304 to perform the operations described herein. In some implementations, the processor 302 includes or corresponds to one or more of the receive processor 258, the transmit processor 264, and the controller/processor 280, and the memory 304 includes or corresponds to the memory 282.

The memory 304 may include synchronization signal block-based reference signal received power (SSB-RSRP) 306, one or more thresholds 308, a maximum permissible exposure (MPE) condition 310, and control resource set (CORESET) information 312. The SSB-RSRP 306 may indicate a signal strength of one or more signals received by the UE 115 and may be compared to the threshold 308 to determine whether to receive DCI via a PDSCH, as further described herein. The MPE condition 310 indicates whether a transmission power detected by the UE 115 is greater than a particular transmission power, such as a transmission power limit set by a regulatory agency such as the Federal Communications Commission (FCC), for example. The MPE condition 310 may be used to determine whether to receive DCI via a PDSCH, as further described herein. The CORESET information 312 may include configuration information related to one or more CORESETs used by the UE 115. In some implementations, the CORESET information 312 includes information corresponding to DCI transmitted via a PDSCH, as further described herein.

The transmitter 316 is configured to transmit data to one or more other devices, and the receiver 318 is configured to receive data from one or more other devices. For example, the transmitter 316 may transmit data to, and the receiver 318 may receive data from, the network entity 350. In some implementations, the transmitter 316 and the receiver 318 may be integrated in one or more transceivers. Additionally, or alternatively, the transmitter 316, the receiver 318, or both may include or correspond to one or more components of the UE 115 described with reference to FIG. 2.

The network entity 350 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220, and the controller/processor 240, and the memory 354 includes or corresponds to the memory 242.

The transmitter 356 is configured to transmit data to one or more other devices, and the receiver 358 is configured to receive data from one or more other devices. For example, the transmitter 356 may transmit data to, and the receiver 358 may receive data from, the UE 115. In some implementations, the transmitter 356 and the receiver 358 may be integrated in one or more transceivers. Additionally, or alternatively, the transmitter 356, the receiver 358, or both may include or correspond to one or more components of base station 105 described with reference to FIG. 2.

In some implementations, the wireless communications system 300 implements a 5G NR network. For example, the UE 115 may include 5G-capable UEs and 5G capable base stations, such as UEs and base stations configured to operate in accordance with a 5G NR network protocol such as that defined by the 3GPP.

During operation of the wireless communications system 300, the UE 115 may receive a PDSCH 370 from the network entity 350. The PDSCH 370 may include DCI 372. For example, the network entity 350 may generate the DCI 372, and the network entity 350 may transmit the DCI 372 via the PDSCH 370 to the UE 115. The DCI 372 may include control information for the UE 115. For example, the DCI 372 may include scheduling information for one or more other data packets to be transmitted via the PDSCH 370 or another PDSCH, as a non-limiting example. Responsive to receiving the DCI 372, the UE 115 may process the DCI 372 based on the PDSCH 370 not including any MAC header. For example, the UE 115 may identify the DCI 372 included in the PDSCH 370, and the UE 115 may process the DCI 372.

The UE 115 may process the DCI 372 independently of a MAC header, also referred to as processing the DCI 372 based on the PDSCH 370 not including any MAC header. For example, the PDSCH 370 may not include any MAC header. To further illustrate, the DCI 372 may be included in a MAC-CE that is transmitted without a MAC header by the network entity 350. Such a MAC CE that does not include a MAC header may be referred to as a compact downlink command. Additionally, or alternatively, the MAC CE may be referred to as a compact MAC CE or a skinny MAC CE. Processing or decoding the DCI 372 may include parsing the DCI 372 using one or more cyclic redundancy check (CRC) masks. In some implementations, the UE 115 may parse DCI that is received in PDSCH(s) that do not include any MAC headers using a different CRC mask than is used to parse DCI that is received in PDCCH(s) or in PDSCH(s) as part of a MAC-CE that includes a MAC header. To illustrate, the UE 115 may store, such as at the memory 304, a first CRC mask and a second CRC mask, which may each be different bitmasks that correspond to different CRC designs, schemes, or codes. The UE 115 may parse DCI that is received in PDSCH(s) that do not include any MAC headers, such as the DCI 372, based on the first CRC mask, and the UE 115 may parse DCI that is received in PDCCH(s) or in PDSCH(s) with MAC headers based on the second CRC mask. In some implementations, the CRC masks are received by the UE 115 as part of a registration with the wireless communications system 300, such as from the network entity 350. Additionally or alternatively, the CRC masks may be pre-configured at the UE 115, and optionally defined in a wireless communication standard specification. Similar CRC masks may be used by the network entity 350. For example, the network entity 350 may generate the DCI 372 based on the first CRC mask that is different that the second CRC mask associated with DCI to be included in PDCCH (s). To further illustrate, the network entity 350 may generate the DCI 372 by appending one or more CRC bits that are XORed with the first CRC mask to the DCI 372, as compared to appending one or more other CRC bits that are XORed with the second CRC mask to DCI that is to be included in a PDCCH or in a transport block that includes a MAC header.

The UE 115 may identify the DCI 372 as DCI without a MAC header based on the resources used to communicate the DCI 372. For example, one or more time resources allocated to the DCI 372, one or more frequency resources allocated to the DCI 372, or both may be associated with a different location, such as in a search space, than one or more time resources, one or more frequency resources, or both, respectively, allocated to a PDCCH. To illustrate, the DCI 372 may be received based on monitoring a first set of physical resource blocks (PRBs), a first set of slots (or symbols), or both, as compared to monitoring a second set of PRBs, a second set of slots (or symbols), or both, that are allocated to a PDCCH that includes DCI. The resources allocated to the DCI 372 may be indicated by RMSI messaging or messaging included in a PBCH, as further described herein. The network entity 350 may transmit the PDSCH 370 that includes the DCI 372 within the one or more time resources, the one or more frequency resources, or both. In some implementations, the UE 115 may identify the DCI 372 based on detection of the DCI 372 over the allocated resources, and based on the identification of the DCI 372 as not including a MAC header, the UE 115 may parse the DCI 372 based on the first CRC mask. Additionally or alternatively, the UE 115 may identify the DCI 372 based on a failure to detect a PDCCH that includes DCI, detection of information included in the PDSCH 370 that does not include any MAC header, or using some other technique.

In some implementations, the PDSCH 370 carrying the compact downlink command, such as the DCI 372, may follow the same CRC and forward error correction (FEC) design as a regular PDSCH, such as a PDSCH that does not carry a compact downlink command (and that typically includes one or more downlink data packets). For example, in addition to receiving the DCI 372 via the PDSCH 370, the UE 115 may receive a second PDSCH 373 that includes a downlink data packet 374. The second PDSCH 373 may be a "regular" PDSCH that is not configured to include a compact downlink command. In some implementations, the DCI 372 may include a first CRC portion, the downlink data packet 374 may include a second CRC portion, and a size of the first CRC portion may be the same as a size of the second CRC portion. As another example, the UE 115 may perform a first FEC decoding on the DCI 372 and a second FEC decoding on the downlink data packet 374, where the first FEC decoding and the second FEC decoding use the same FEC decoding scheme. Additionally, or alternatively, the PDSCH 370 carrying the compact downlink command (the DCI 372) may follow the same low density parity check (LDPC) encoding scheme or code as a regular PDSCH (the second PDSCH 373). For example, the UE 115 may decode the DCI 372 according to the same LDPC encoding scheme or code as that used for the downlink data packet 374. Using the same CRC design (or the same FEC design or LDPC encoding scheme or code) for the PDSCH 370 as the second PDSCH 373 may reduce the complexity involved with receiving the PDSCH 370.

In some other implementations, the PDSCH 370 carrying the compact downlink command (the DCI 372) may follow a different CRC, FEC design, or LDPC encoding scheme or code than a regular PDSCH (the second PDSCH 373). For example, the DCI 372 may include a first CRC portion, the downlink data packet 374 may include a second CRC portion, and a size of the first CRC portion may be different than a size of the second CRC portion. As another example, the UE 115 may perform a first FEC decoding on the DCI 372 and a second FEC decoding on the downlink data packet 374 using a different FEC decoding scheme. Additionally, or alternatively, the PDSCH 370 carrying the compact downlink command (the DCI 372) may follow a different LDPC encoding scheme or code as a regular PDSCH. For example, the UE 115 may decode the DCI 372 according to a different LDPC encoding scheme or code as that used for the downlink data packet 374. Configuring the compact downlink command with its own error correcting schemes (such as CRC schemes, FEC encoding schemes, or LDPC encoding schemes) or codes may improve receipt of the compact downlink command at the UE 115.

In some implementations, the compact downlink command may be used as a substitute for a msg2 PDCCH or msgB PDCCH which typically includes control information scheduling a msg2, or msgB, data transmission via a PDSCH. For example, the network entity 350 may be configured to transmit the DCI 372 via the PDSCH 370 to the UE 115 instead of transmitting a msg2 PDCCH or a msgB PDCCH to the UE 115. The DCI 372 may include some or all of the same control information as that which would be typically included in a msg2 PDCCH or a msgB PDCCH.

In some such implementations, time resources corresponding to the compact downlink command (the DCI 372), frequency resources corresponding to the compact downlink command, or both, may be configured by RMSI messaging. For example, prior to transmitting the PDSCH 370 that includes the DCI 372, the network entity 350 may transmit one or more RMSI messages 378 via a PDCCH 376 to the UE 115, and the UE 115 may receive the RMSI message 378 via the PDCCH 376 from the network entity 350. The PDCCH 376 may include the RMSI message 378. The RMSI message 378 may indicate one or more time resources allocated for the compact downlink command, one or more frequency resources allocated for the compact downlink command, or both one or more time resources and one or more frequency resources allocated for the compact downlink command. For example, the RMSI message 378 may indicate one or more time blocks, such as slots or symbols, allocated for the compact downlink command, one or more frequency bands or subbands, such as PRBs, allocated for the compact downlink command, or a combination thereof. In some such implementations, a modulation and coding scheme (MCS) and other transmission parameters for the DCI 372 may be configured by RMSI messaging. For example, the RMSI message 378 may further indicate a MCS used for transmitting the compact downlink command. Additionally, or alternatively, the RMSI message 378 may further indicate one or more other transmission parameters used for transmitting the compact downlink command, such as a type of keying modulation used, among other examples.

In some other implementations, one or more of the MCS or other transmission parameters for the compact downlink command (the DCI 372) may be fixed based on a wireless communication standard specification, such as a 3GPP standard specification. To illustrate, a MCS used for transmitting the compact downlink command, one or more transmission parameters used for transmitting the compact downlink command, or both, may be preconfigured at the UE 115 according to a wireless communication standard specification. For example, the compact downlink command may be generated using quadrature phase shift keying (QPSK) modulation, as specified by a wireless communication standard specification, as a non-limiting example.

In some such implementations, the compact downlink command may be configured for only a subset of UEs that use a special type, a special format, or a special subset of resources of a physical random access channel (PRACH) or msgA preamble, which itself may be based on a synchronization signal block-based reference signal receive power (SSB-RSRP) or a maximum permissible exposure (MPE) condition. To illustrate, the UE 115 may determine the SSB-RSRP 306 based on one or more signals received from the network entity 350. The UE 115 may compare the SSB-RSRP 306 to the threshold 308. Additionally, or alternatively, the UE 115 may detect whether the MPE condition 310 is satisfied based on one or more signals received from the network entity 350. If the SSB-RSRP 306 satisfies the threshold 308 or if the MPE condition 310 is detected or satisfied, the UE 115 may indicate satisfaction of the threshold 308 or satisfaction of the MPE condition 310 to the network entity 350. For example, the UE 115 may use the special type, format, or subset of resources of the PRACH or msgA preamble to provide indication to the network entity 350. Additionally, or alternatively, the UE 115 may transmit a message that includes one or more indicators to the network entity 350 via a physical uplink control channel (PUCCH) or a physical uplink shared channel (PUSCH). The network entity 350 may determine whether to transmit the DCI 372 via the PDSCH 370 (as compared to transmitting a msg2 or msgB via a PDCCH) based on the indication from the UE 115. For example, the network entity 350 may transmit the DCI 372 via the PDSCH 370 in response to receiving an indication from the UE 115 that the SSB-RSRP 306 satisfies the threshold 308, or in response to receiving an indication from the UE 115 that the MPE condition 310 is detected or satisfied, which, as described above, may be conveyed via the type, the format, or the subset of the resources of the PRACH or the msgA preamble used by the UE 115. In this manner, the UE 115 may receive the DCI 372 in a configuration based on whether the SSB-RSRP 306 satisfies the threshold 308 or based on detecting the MPE condition 310 or satisfaction of the MPE condition 310.

In some other implementations, the compact downlink command may be used as a substitute for an RMSI PDCCH that typically includes control information scheduling an RMSI data transmission via a PDSCH instead of as a substitute for a msg2 PDCCH or a msgB PDCCH. For example, the network entity 350 may be configured to transmit the compact downlink command to the UE 115 via the PDSCH 370 instead of transmitting a RMSI PDCCH to the UE 115. The DCI 372 may include some or all of the same control information as would typically be included in the RMSI PDCCH.

In some implementations, time resources corresponding to the compact downlink command (including the DCI 372), frequency resources corresponding to the compact downlink command, or both, may be configured implicitly by a PBCH as part of configuration of a particular CORESET, such as CORESET0. For example, prior to transmitting the PDSCH 370 that includes the DCI 372, the network entity 350 may transmit a PBCH 380 to the UE 115. The PBCH 380 may include a configuration message 382 that indicates one or more time resources allocated for the compact downlink command, one or more frequency resources allocated for the compact downlink command, or both one or more time resources and one or more frequency resources allocated for the compact downlink command. In some such implementations, the PBCH 380 is transmitted by the network entity 350 as part of a configuration of a particular CORESET. In some such implementations, the particular CORESET is CORESET0. For example, the UE 115 may receive the PBCH 380 (including the configuration message 382) from the network entity 350 as part of a configuration of CORESET0 at the UE 115. In some such implementations, one or more rows in one or more tables corresponding to configuration of CORESET0 may indicate the time resources, the frequency resources, or both.

In some such implementations, indications of the time resources, the frequency resources, or both, are included in a new column of one or more of the tables corresponding to CORESET0 configuration, such as one or more tables included in CORESET information 312. For example, the one or more time resources, the one or more frequency resources, or both, may be indicated by a special column of a table corresponding to the configuration of CORESET0. In some such implementations, legacy UEs, such as UEs that are not configured to receive compact downlink commands, may use the regular columns of the one or more tables corresponding to the configuration of CORESET0, and new UEs, such as UEs that are configured to receive compact downlink commands, may use the regular columns and the special column to monitor resources for RMSI messages via a PDCCH and also monitor resources for compact downlink commands via the PDSCH 370. Monitoring for both the RMSI messages and the compact downlink commands may increase coverage (also referred to as reliability of receipt) of the control information included in the compact downlink commands and the RMSI messages. For example, communicating control information via both compact downlink commands and RMSI messages may improve the probability that a UE receives the control information without error. Alternatively, replacing the RMSI messages with the compact downlink commands may reduce overhead and increase throughput in the wireless communications system 300.

To illustrate, in implementations where the control information is communicated via both compact downlink commands and RMSI messages, the network entity 350 may transmit, during configuration of a particular CORESET (for example, CORESET0), a first set of transmission parameters corresponding to the compact downlink command and a second set of transmission parameters corresponding to the RMSI message 378. The first set of transmission parameters may be indicated by the special column of the one or more tables corresponding to the configuration of CORESET0, and the second set of transmission parameters may be indicated by the regular columns of the one or more tables. The UE 115 may monitor resources, such as the PDSCH 370, for the compact downlink command according to the first set of transmission parameters, and the UE 115 may monitor resources, such as the PDCCH 376, for the RMSI message 378 according to the second set of transmission parameters. The network entity 350 may transmit the PDSCH 370 including the compact downlink command as well as the PDCCH 376 that includes the RMSI message 378. Monitoring for both the compact downlink command and the RMSI message 378 may improve the likelihood that at least one of the messages is received, thus improving coverage of the control information included in the DCI 372 and the RMSI message 378. In some alternate implementations, the UE 115 may only monitor resources for the compact downlink command and may not monitor resources for the RMSI message 378, to reduce power consumption and complexity at the UE 115.

Thus, FIG. 3 describes techniques for communicating DCI via a PDSCH instead of via a PDCCH. The DCI may be communicated independently of a MAC header. For example, the DCI 372 may be included in a MAC-CE that does not include any MAC header and is included in the PDSCH 370 that is transmitted from the network entity 350 to the UE 115. Transmitting the DCI 372 in this manner may improve the coverage of DCI and may reduce a bottleneck on millimeter-wave communications. For example, the PDSCH 370 (including the DCI 372) may be transmitted using a narrower communication beam than is used to transmit a PDCCH that would otherwise include the DCI 372, which may provide more gain and thus increase the likelihood that a UE correctly receives the DCI 372. By including the DCI 372 in the PDSCH 370 without any MAC header, instead of in a PDCCH or in a PDSCH as part of a TB that includes a MAC header, throughput may be increased and overhead may be decreased in the wireless communications system 300.

Figure 6:
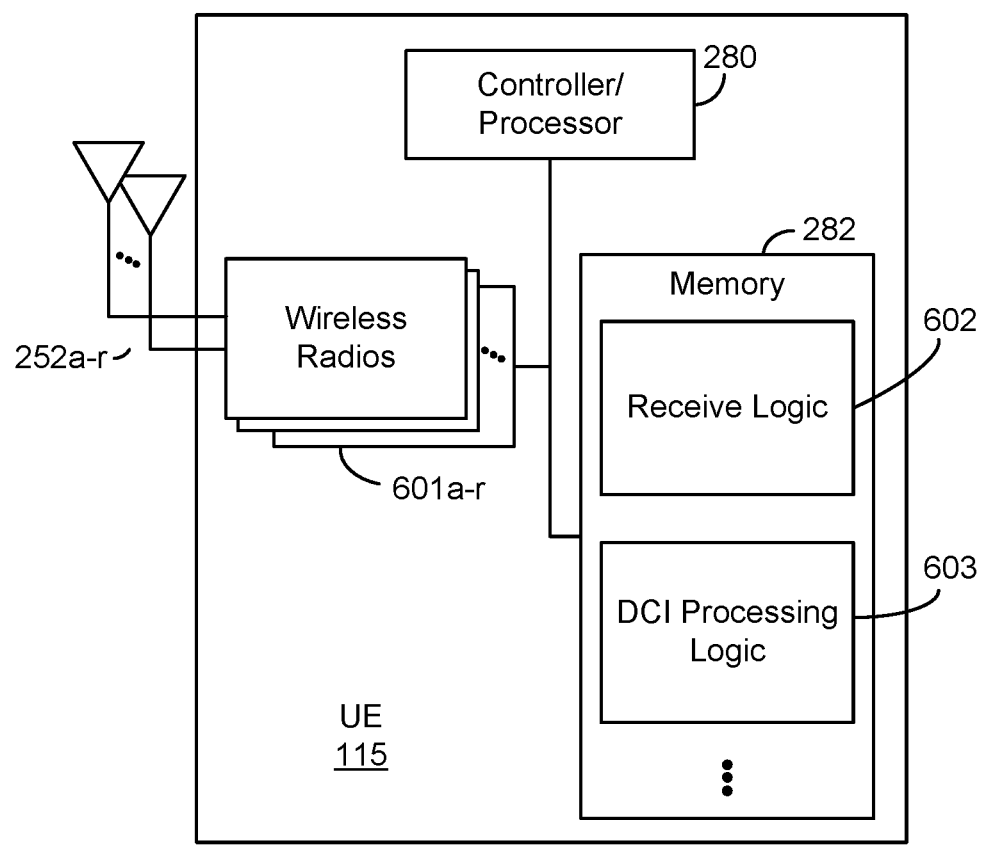
FIG. 6 is a block diagram illustrating an example UE that supports receiving a PDSCH that includes DCI and that does not include any MAC header according to one or more aspects.

Referring to FIG. 4, a flow diagram illustrating an example process 400 performed by a UE that supports receiving a PDSCH that includes DCI and that does not include any MAC header according to one or more aspects is shown. For example, example blocks of the process 400 may cause the UE to receive and process DCI included in a PDSCH that does not include any MAC header, according to one or more aspects of the present disclosure. The example blocks will also be described with respect to the UE 115 as illustrated in FIG. 6. FIG. 6 is a block diagram illustrating an example UE 115 that supports receiving a PDSCH that includes DCI and that does not include any MAC header according to one or more aspects. The UE 115 may be configured to perform one or more operations to receive and process DCI included in a PDSCH that does not include any MAC header, according to one or more aspects of the present disclosure. The UE 115 includes the structure, hardware, and components as illustrated for the UE 115 of FIG. 2 or 3. For example, the UE 115 includes the controller/processor 280, which operates to execute logic or computer instructions stored in the memory 282, as well as controlling the components of the UE 115 that provide the features and functionality of the UE 115. The UE 115, under control of the controller/processor 280, transmits and receives signals via wireless radios 601*a-r* and the antennas 252*a-r*. The wireless radios 601*a-r* include various components and hardware, as illustrated in FIG. 2 for the UE 115, including the modulator/demodulators 254*a-r*, the MIMO detector 256, the receive processor 258, the transmit processor 264, and the TX MIMO processor 266.

Figure 7:
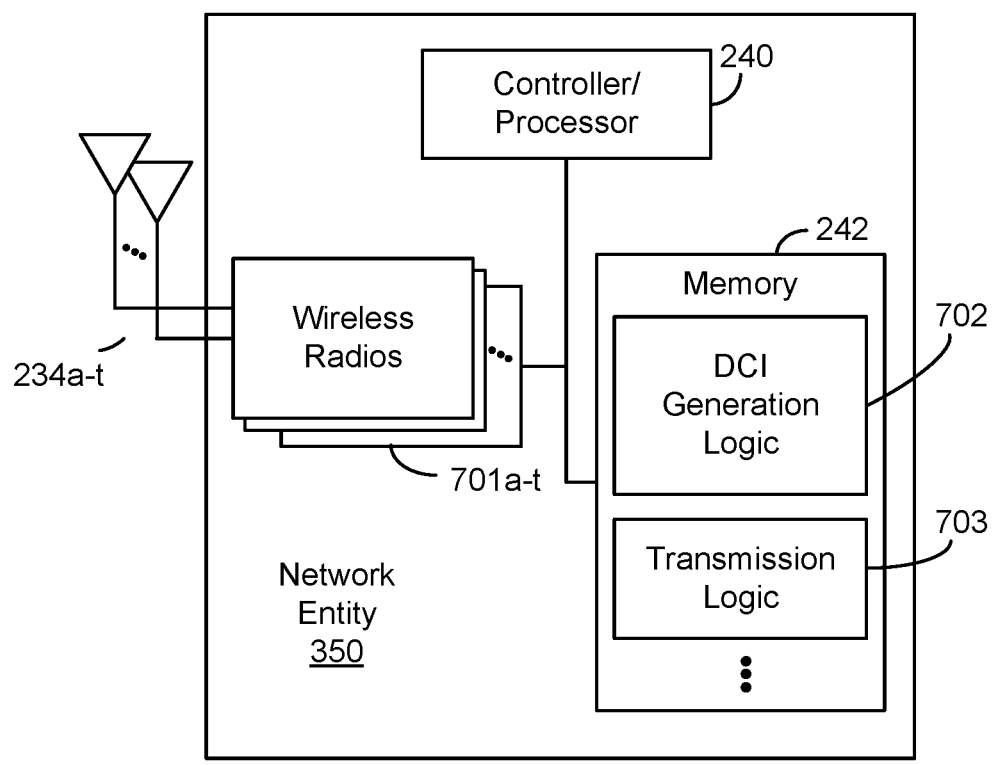
FIG. 7 is a block diagram illustrating an example network entity that supports transmitting a PDSCH that includes DCI and that does not include any MAC header according to one or more aspects.

As shown, the memory 282 may include receive logic 602 and DCI processing logic 603. The receive logic 602 and the DCI processing logic 603 may include or correspond to the processor 302, the receiver 318, or a combination thereof. For example, the receive logic 602 may be configured to receive one or more signals, such as the DCI 372, the downlink data packet 374, the RMSI message 378, the configuration message 382, or a combination thereof, and the DCI processing logic 603 may be configured to process the DCI 372. The UE 115 may receive signals from or transmit signals to one or more network entities, such as the base station 105, the network entity 350 of FIG. 3, a core network, a core network device, or a network entity as illustrated in FIG. 7.

Referring to FIG. 4, a flow diagram illustrating an example process 400 of UE operations for communication is shown. In some implementations, the process 400 may be performed by the UE 115. In some other implementations, the process 400 may be performed by an apparatus configured for wireless communication. For example, the apparatus may include at least one processor, and a memory coupled to the processor. The processor may be configured to perform operations of the process 400. In some other implementations, the process 400 may be performed or executed using a non-transitory computer-readable medium having program code recorded thereon. The program code may be program code executable by a computer for causing the computer to perform operations of the process 400.

As illustrated at block 402, a UE receives, from a network entity, a PDSCH that includes DCI and that does not include any MAC header. As an example of block 402, the UE 115 may receive a PDSCH that includes DCI using wireless radios 601*a-r* and antennas 252*a-r*. To further illustrate, the UE 115 may execute, under control of the controller/processor 280, the receive logic 602 stored in the memory 282. The execution environment of the receive logic 602 provides the functionality to receive a PDSCH that includes DCI and that does not include any MAC header.

At block 404, the UE processes the DCI based on the PDSCH not including any MAC header. To illustrate, the UE 115 may execute, under control of the controller/processor 280, the DCI processing logic 603 stored in the memory 282. The execution environment of the DCI processing logic 603 provides the functionality to process the DCI based on the PDSCH not including any MAC header.

In some implementations, the process 400 further includes receiving, from the network entity, a second PDSCH that includes a downlink data packet. The DCI includes a first cyclic redundancy check portion, the downlink data packet includes a second cyclic redundancy check portion, and a size of the first cyclic redundancy check portion is the same as a size of the second cyclic redundancy check portion. Additionally, or alternatively, the process 400 further includes receiving, from the network entity, a second PDSCH that includes a downlink data packet and decoding the DCI and the downlink data packet according to the same LDPC encoding scheme.

In some implementations, processing the DCI may include parsing the identified DCI based on a first CRC mask that is different than a second CRC mask associated with parsing DCI received in a PDCCH or in a downlink data packet that includes a MAC header. For example, the UE 115 may parse the DCI 372 based on a different CRC mask that is used to parse DCI included in PDCCH(s) or in downlink data packet(s). Additionally or alternatively, one or more time resources allocated to the DCI, one or more frequency resources allocated to the DCI, or both are associated with a different location than one or more time resources, one or more frequency resources, or both, respectively, allocated to a PDCCH.

In some implementations, the UE is configured to receive the DCI over the PDSCH instead of a msg2 PDCCH or a msgB PDCCH from the network entity. In some implementations, the process 400 also includes receiving, from the network entity, one or more RMSI messages. The one or more RMSI messages indicates one or more time resources allocated for the DCI, one or more frequency resources allocated for the DCI, or both the one or more time resources and the one or more frequency resources allocated for the DCI. In some such implementations, the one or more RMSI messages further indicate a MCS corresponding to the DCI or the PDSCH. In some such implementations, the one or more RMSI messages further indicate one or more other transmission parameters corresponding to the DCI or the PDSCH.

In some implementations, the process 400 includes determining that a SSB-based RSRP satisfies a threshold or detecting a MPE condition and transmitting, to the network entity, an indicator of the SSB-based RSRP satisfying the threshold or detection of the MPE condition. In some such implementations, receiving the DCI is further based on a type, a format, or a subset of a PRACH or a msgA preamble used by the UE. Additionally, or alternatively, the DCI is processed based on a MCS corresponding to the DCI, one or more transmission parameters corresponding to the DCI, or both, that are preconfigured at the UE. In some such implementations, the MCS or the transmission parameters may be defined in a wireless communication standard specification.

In some implementations, the UE is configured to receive the DCI over the PDSCH instead of a RMSI PDCCH from the network entity. In some such implementations, the process 400 also includes receiving, from the network entity, a PBCH. The PBCH includes a configuration message. The configuration message indicates one or more time resources allocated for the DCI, one or more frequency resources allocated for the DCI, or both the one or more time resources and the one or more frequency resources allocated for the DCI. In some such implementations, the PBCH is received as part of a configuration of a particular CORESET. In some such implementations, the particular CORESET is CORESET0. In some such implementations, the one or more time resources, the one or more frequency resources, or both, are indicated by a particular column of a table corresponding to configuration of CORESET0.

In some implementations, the process 400 further includes receiving, during configuration of a particular CORESET, a first set of transmission parameters corresponding to the DCI and a second set of transmission parameters, and receiving a RMSI PDCCH from the network entity. The second set of transmission parameters corresponds to the RMSI PDCCH.

Thus, the process 400 enables the UE to receive and process DCI included in a PDSCH that does not include any MAC header. Receiving the DCI included in the PDSCH and without a MAC header may improve the coverage of downlink control and may reduce a bottleneck on millimeter-wave communications. For example, the PDSCH (including the DCI) may be received using a narrower communication beam than is used to receive a PDCCH, which may provide more gain and thus increase the likelihood that the UE correctly receives the DCI. By receiving the PDSCH that includes the DCI and that does not include any MAC header, instead of a PDCCH that includes DCI, throughput may be increased and overhead may be decreased in a wireless communications system.

FIG. 5 is a flow diagram illustrating an example process performed by a network entity that supports transmitting a PDSCH that includes DCI and that does not include any MAC header according to one or more aspects. For example, example blocks of the process may cause the network entity to generate and transmit a PDSCH that includes DCI and that does not include any MAC header according to one or more aspects of the present disclosure. The example blocks will also be described with respect to the network entity 350 as illustrated in FIG. 7. FIG. 7 is a block diagram illustrating an example network entity 350 that supports transmitting a PDSCH that includes DCI and that does not include any MAC header according to one or more aspects of the present disclosure. The network entity 350 may include the base station 105, a network, or a core network, as illustrative, non-limiting examples. The network entity 350 includes the structure, hardware, and components as illustrated for the base station 105 of FIGS. 1 and 2, the network entity 350 of FIG. 3, or a combination thereof. For example, the network entity 350 may include the controller/processor 240, which operates to execute logic or computer instructions stored in the memory 242, as well as controlling the components of the network entity 350 that provide the features and functionality of the network entity 350. The network entity 350, under control of the controller/processor 240, transmits and receives signals via wireless radios 701a-t and the antennas 234a-t. The wireless radios 701a-t include various components and hardware, as illustrated in FIG. 2 for the network entity 350 (such as the base station 105), including the modulator/demodulators 232a-t, the transmit processor 220, the TX MIMO processor 230, the MIMO detector 236, and the receive processor 238.

As shown, the memory 242 may include DCI generation logic 702 and transmission logic 703. The DCI generation logic 702 and the transmission logic 703 may include or correspond to the processor 352, the transmitter 356, or a combination thereof. For example, the DCI generation logic 702 may be configured to generate the DCI 372 independently of a MAC header, and the transmission logic 703 may be configured to transmit one or more signals, such as the DCI 372, the downlink data packet 374, the RMSI message 378, the configuration message 382, or a combination thereof. The network entity 350 may receive signals from or transmit signals to one or more UEs, such as the UE 115 of FIG. 1-3 or 7.

Referring to FIG. 5, a flow diagram illustrating an example process 500 of network entity operations for communication is shown. In some implementations, the process 500 may be performed by the network entity 350. In some other implementations, the process 500 may be performed by an apparatus configured for wireless communication. For example, the apparatus may include at least one processor, and a memory coupled to the processor. The processor may be configured to perform operations of the process 500. In some other implementations, the process 500 may be performed or executed using a non-transitory computer-readable medium having program code recorded thereon. The program code may be program code executable by a computer for causing the computer to perform operations of the process 500.

As illustrated at block 502, a network entity generates DCI. The generating is independent of a MAC header, such that the DCI is included in a MAC-CE that does not include any MAC header. To illustrate, the network entity 350 may execute, under control of the controller/processor 240, the DCI generation logic 702 stored in the memory 242. The execution environment of the DCI generation logic 702 provides the functionality to generate DCI without any MAC header.

At block 504, the network entity transmits, to a UE, a PDSCH that includes the DCI and that does not include any MAC header. As an example of block 502, the network entity 350 may transmit the PDSCH using wireless radios 701a-t and antennas 234a-t. To further illustrate, the network entity 350 may execute, under control of the controller/processor 240, the transmission logic 703 stored in the memory 242. The execution environment of the transmission logic 703 provides the functionality to transmit the PDSCH that includes the DCI and does not include any MAC header.

In some implementations, the process 500 further includes transmitting, to the UE, a second PDSCH that includes a downlink data packet. The DCI includes a first cyclic redundancy check portion, the downlink data packet includes a second cyclic redundancy check portion, and a size of the first cyclic redundancy check portion is the same as a size of the second cyclic redundancy check portion. Additionally, or alternatively, the process 500 further includes encoding the DCI and a downlink data packet according to the same LDPC encoding scheme or code, and transmitting the downlink data packet to the UE via a second PDSCH.

In some implementations, the network entity is configured to transmit the DCI over the PDSCH instead of a msg2 PDCCH or a msgB PDCCH to the UE. In some implementations, the process 500 further includes transmitting, to the UE, one or more RMSI messages. The one or more RMSI messages indicate one or more time resources allocated for the DCI, one or more frequency resources allocated for the DCI, or both one or more time resources and one or more frequency resources allocated for the DCI. In some such implementations, the one or more RMSI messages further indicate a MCS corresponding to the DCI. In some such implementations, the one or more RMSI messages further indicate one or more other transmission parameters corresponding to the DCI. Additionally, or alternatively, the process 500 may include receiving, from the UE, an indication of a SSB-based RSRP satisfying a threshold or an indication of a MPE condition, and determining whether to transmit the PDSCH that includes the DCI and that does not include any MAC header based on receipt of either indication. In some such implementations, determining whether to transmit the PDSCH is further based on a type, a format, or a subset of a PRACH or a msgA preamble used to communicate with the UE. In some implementations, a MCS corresponding to the PDSCH, one or more other transmission parameters corresponding to the DCI, or both, are preconfigured at the UE according to a wireless communication standard specification.

In some implementations, the network entity is configured to transmit the DCI over the PDSCH instead of a RMSI PDCCH to the UE. In some implementations, the process 500 further includes transmitting, to the UE, a PBCH. The PBCH includes a configuration message. The configuration message indicates one or more time resources allocated for the DCI, one or more frequency resources allocated for the DCI, or both one or more time resources and one or more frequency resources allocated for the DCI. In some such implementations, the PBCH is transmitted as part of a configuration of a particular CORESET. In some such implementations, the particular CORESET is CORESET0. In some such implementations, the one or more time resources, the one or more frequency resources, or both, are indicated by a particular column of a table corresponding to configuration of CORESET0.

In some such implementations, the process 500 further includes transmitting, during configuration of a particular CORESET, a first set of transmission parameters corresponding to the DCI and a second set of transmission parameters, and transmitting a RMSI PDCCH to the UE according to the second set of transmission parameters.

Thus, the process 500 enables the network entity to generate and transmit a PDSCH that includes DCI and that does not include any MAC header. Transmitting the DCI included in the PDSCH and without any MAC header may improve the coverage of downlink control and may reduce a bottleneck on millimeter-wave communications. For example, the PDSCH (including the DCI) may be transmitted using a narrower communication beam than is used to transmit a PDCCH, which may provide more gain and thus increase the likelihood that a UE correctly receives the DCI. By transmitting the DCI via the PDSCH without any MAC header, instead of a PDCCH, throughput may be increased and overhead may be decreased in a wireless communications system.

It is noted that one or more blocks (or operations) described with reference to FIGS. 4 and 5 may be combined with one or more blocks (or operations) of another of figure. For example, one or more blocks (or operations) of FIG. 4 may be combined with one or more blocks (or operations) FIG. 5. As another example, one or more blocks of FIG. 4 or 5 may be combined with one or more blocks (or operations) of another of FIG. 2 or 3. Additionally, or alternatively, one or more operations described above with reference to FIGS. 1-6 may be combine with one or more operations described with reference to FIG. 7.

In some aspects, techniques for enabling communication of a PDSCH that includes DCI and that does not include any MAC header may include additional aspects, such as any single aspect or any combination of aspects described below and/or in connection with one or more other processes or devices described elsewhere herein. In some aspects, enabling communication of a PDSCH that includes DCI and that does not include any MAC header may include an apparatus configured to receive, from a network entity, a PDSCH that includes DCI and does not include any MAC header. The apparatus may be further configured to process the DCI based on the PDSCH not including any MAC header. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the apparatus receives, from the network entity, a second PDSCH that includes a downlink data packet. The DCI includes a first cyclic redundancy check portion, the downlink data packet includes a second cyclic redundancy check portion, and a size of the first cyclic redundancy check portion is the same as a size of the second cyclic redundancy check portion.

In a second aspect, alone or in combination with the first aspect, the apparatus receives, from the network entity, a second PDSCH that includes a downlink data packet, and the apparatus decodes the DCI and the downlink data packet according to the same LDPC code.

In a third aspect, alone or in combination with one or more of the first through second aspects, processing the DCI includes parsing the DCI based on a first CRC mask that is different than a second CRC mask associated with parsing DCI received in a PDCCH or in a downlink data packet that includes a MAC header.

In a fourth aspect, alone or in combination with one or more of the first through third aspects, one or more time resources allocated to the DCI, one or more frequency resources allocated to the DCI, or both are associated with a different location than one or more time resources, one or more frequency resources, or both, respectively, allocated to a PDCCH.

In a fifth aspect, alone or in combination with one or more of the first through fourth aspects, the apparatus is configured to receive the DCI over the PDSCH instead of a msg2 PDCCH or a msgB PDCCH from the network entity.

In a sixth aspect, alone or in combination with one or more of the first through fifth aspects, the apparatus receives, from the network entity, one or more RMSI messages. The one or more RMSI messages indicate one or more time resources allocated for the DCI, one or more frequency resources allocated for the DCI, or both the one or more time resources and the one or more frequency resources allocated for the DCI.

In a seventh aspect, in combination with the sixth aspect, the one or more RMSI messages further indicate a MCS corresponding to the DCI.

In an eighth aspect, in combination with one or more of the sixth through seventh aspects, the one or more RMSI messages further indicate one or more other transmission parameters corresponding to the DCI.

In a ninth aspect, in combination with one or more of the sixth through eighth aspects, the apparatus determines that a SSB-based RSRP satisfies a threshold or detects a MPE condition. The apparatus transmits, to the network entity, an indicator of the SSB-based RSRP satisfying the threshold or detection of the MPE condition.

In a tenth aspect, in combination with the ninth aspect, receiving the DCI is further based on a type, a format, or a subset of a PRACH or a msgA preamble used by the UE.

In an eleventh aspect, alone or in combination with one or more of the first through fifth aspects, a MCS corresponding to the DCI, one or more transmission parameters corresponding to the DCI, or both, are preconfigured at the UE according to a wireless communication standard specification.

In a twelfth aspect, alone or in combination with one or more of the first through fourth aspects, the apparatus is configured to receive the PDSCH that includes the DCI and does not include any MAC header instead of a RMSI PDCCH from the network entity.

In a thirteenth aspect, in combination with the twelfth aspect, the apparatus receives, from the network entity, a PBCH. The PBCH includes a configuration message. The configuration message indicates one or more time resources allocated for the DCI, one or more frequency resources allocated for the DCI, or both the one or more time resources and the one or more frequency resources allocated for the DCI.

In a fourteenth aspect, in combination with the thirteenth aspect, the PBCH is received as part of a configuration of a particular CORESET.

In a fifteenth aspect, in combination with the fourteenth aspect, the particular CORESET is CORESET0.

In a sixteenth aspect, in combination with the fifteenth aspect, the one or more time resources, the one or more frequency resources, or both, are indicated by a particular column of a table corresponding to configuration of CORESET0.

In a seventeenth aspect, alone or in combination with one or more of the first through fourth aspects, the apparatus receives, during configuration of a particular CORESET, a first set of transmission parameters corresponding to the DCI and a second set of transmission parameters, and the apparatus receives a RMSI PDCCH from the network entity according to the second set of transmission parameters.

In some aspects, an apparatus configured for wireless communication, such as a network entity, is configured to generate DCI. The apparatus is also configured to transmit, to a UE, a PDSCH that includes the DCI and that does not include any MAC header. In some implementations, the apparatus includes a wireless device, such as a network entity. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In an eighteenth aspect, the apparatus transmits, to the UE, a second PDSCH that includes a downlink data packet. The DCI includes a first cyclic redundancy check portion, the downlink data packet includes a second cyclic redundancy check portion, and a size of the first cyclic redundancy check portion is the same as a size of the second cyclic redundancy check portion.

In a nineteenth aspect, alone or in combination with the eighteenth aspect, the apparatus encodes the DCI and a downlink data packet according to the same LDPC code and transmits, to the UE, a second PDSCH that includes the downlink data packet.

In a twentieth aspect, alone or in combination with the eighteenth or nineteenth aspects, the apparatus encodes the DCI based on a first CRC mask that is different than a second CRC mask associated with encoding DCI for transmission in a PDCCH or in a downlink data packet that includes a MAC header.

In a twenty-first aspect, alone or in combination with one or more of the eighteenth through twentieth aspects, one or more time resources allocated to the DCI, one or more frequency resources allocated to the DCI, or both are associated with a different location than one or more time resources, one or more frequency resources, or both, respectively, allocated to a PDCCH.

In a twenty-second aspect, alone or in combination with one or more of the eighteenth through twenty-first aspects, the apparatus is configured to transmit the DCI over the PDSCH instead of a msg2 PDCCH or a msgB PDCCH to the UE.

In a twenty-third aspect, alone or in combination with one or more of the eighteenth through twenty-second aspects, the apparatus transmits, to the UE, one or more RMSI messages. The one or more RMSI messages indicate one or more time resources allocated for the DCI, one or more frequency resources allocated for the DCI, or both one or more time resources and one or more frequency resources allocated for the DCI.

In a twenty-fourth aspect, in combination with the twenty-third aspect, the one or more RMSI messages further indicate a MCS corresponding to the PDSCH.

In a twenty-fifth aspect, in combination with one or more of the twenty-third through twenty-fourth aspects, the one or more RMSI messages further indicate one or more other transmission parameters corresponding to the DCI.

In a twenty-sixth aspect, alone or in combination with one or more of the eighteenth through twenty-second aspects, the apparatus receives, from the UE, an indication of a SSB-based RSRP satisfying a threshold or an indication of a MPE condition. The apparatus determines whether to transit the PDSCH that includes the DCI and does not include any MAC header based on receipt of either indication.

In a twenty-seventh aspect, in combination with the twenty-sixth aspect, determining whether to transmit the DCI is further based on a type, a format, or a subset of a PRACH or a msgA preamble used by the UE.

In a twenty-eighth aspect, in combination with one or more of the eighteenth through twenty-second aspects, a MCS corresponding to the DCI, one or more other transmission parameters corresponding to the DCI, or both, are preconfigured at the UE according to a wireless communication standard specification.

In a twenty-ninth aspect, alone or in combination with one or more of the eighteenth through twenty-first aspects, the apparatus is configured to transmit the DCI over the PDSCH instead of a RMSI PDCCH to the UE.

In a thirtieth aspect, alone or in combination with one or more of the eighteenth through twenty-ninth aspects, the apparatus transmits, to the UE, a PBCH. The PBCH includes a configuration message. The configuration message indicates one or more time resources allocated for the DCI, one or more frequency resources allocated for the DCI, or both one or more time resources and one or more frequency resources allocated for the DCI.

In a thirty-first aspect, in combination with the thirtieth aspect, the PBCH is transmitted as part of a configuration of a particular CORESET.

In a thirty-second aspect, in combination with the thirty-first aspect, the particular CORESET is CORESET0.

In a thirty-third aspect, in combination with the thirty-second aspect, the one or more time resources, the one or more frequency resources, or both, are indicated by a particular column of a table corresponding to configuration of CORESET0.

In a thirty-fourth aspect, alone or in combination with one or more of the eighteenth through twenty-first aspects, the apparatus transmits, during configuration of a particular CORESET, a first set of transmission parameters corresponding to the DCI and a second set of transmission parameters. The apparatus transmits, to the UE, a RMSI PDCCH according to the second set of transmission parameters.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, etc., or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   receiving, from a network entity, a physical downlink shared channel (PDSCH) that includes downlink control information (DCI), wherein the PDSCH does not include any media access control (MAC) header, and wherein the DCI is included within a media access control-control element (MAC-CE); and
   processing the DCI based on the PDSCH not including any MAC header.

2. The method of claim 1, further comprising receiving, from the network entity, a second PDSCH that includes a downlink data packet, wherein the DCI includes a first cyclic redundancy check portion, wherein the downlink data packet includes a second cyclic redundancy check portion, and wherein a size of the first cyclic redundancy check portion is the same as a size of the second cyclic redundancy check portion.

3. The method of claim 1, further comprising:
   receiving, from the network entity, a second PDSCH that includes a downlink data packet; and
   decoding the DCI and the downlink data packet according to a same low density parity check (LDPC) code.

4. The method of claim 1, wherein processing the DCI comprises parsing the DCI based on a first cyclic redundancy check (CRC) mask that is different than a second CRC mask associated with parsing DCI received in a physical downlink control channel (PDCCH) or in a downlink data packet that includes a MAC header.

5. The method of claim 1, wherein one or more time resources allocated to the DCI, one or more frequency resources allocated to the DCI, or both are associated with a different location than one or more time resources, one or more frequency resources, or both, respectively, allocated to a physical downlink control channel (PDCCH).

6. The method of claim 1, further comprising receiving, from the network entity, one or more remaining minimum system information (RMSI) messages, the one or more RMSI messages indicating one or more time resources allocated for the DCI, one or more frequency resources allocated for the DCI, or both one or more time resources and one or more frequency resources allocated for the DCI, and wherein the one or more RMSI messages further indicate a modulation and coding scheme (MCS) corresponding to the PDSCH.

7. The method of claim 6, further comprising:
determining that a synchronization signal block-based reference signal received power (SSB-based RSRP) satisfies a threshold or detecting a maximum permissible exposure (MPE) condition; and
transmitting, to the network entity, an indicator of the SSB-based RSRP satisfying the threshold or detection of the MPE condition.

8. The method of claim 1, wherein the DCI is processed based on a modulation and coding scheme (MCS), one or more transmission parameters, or both, that are preconfigured at the UE.

9. The method of claim 1, further comprising:
transmitting, to the network entity, an indicator that a synchronization signal block-based reference signal received power (SSB-based RSRP) satisfies a threshold or that a maximum permissible exposure (MPE) condition is detected, wherein the DCI is received in the PDSCH without any MAC header based on transmitting the indicator.

10. A user equipment (UE) comprising:
at least one processor; and
a memory coupled with the at least one processor and storing processor-readable code that, when executed by the at least one processor, is configured to:
receive, from a network entity, a physical downlink shared channel (PDSCH) that includes downlink control information (DCI), wherein the PDSCH does not include any media access control (MAC) header, and wherein the DCI is included within a media access control-control element (MAC-CE); and
process the DCI based on the PDSCH not including any MAC header.

11. The UE of claim 10, wherein the at least one processor is further configured to receive, from the network entity, a second PDSCH that includes a downlink data packet, wherein the DCI includes a first cyclic redundancy check portion, wherein the downlink data packet includes a second cyclic redundancy check portion, and wherein a size of the first cyclic redundancy check portion is the same as a size of the second cyclic redundancy check portion.

12. The UE of claim 10, wherein the at least one processor is further configured to:
receive, from the network entity, a second PDSCH that includes a downlink data packet; and
decode the DCI and the downlink data packet according to a same low density parity check (LDPC) code.

13. The UE of claim 10, wherein the at least one processor is configured to process the DCI by parsing the DCI based on a first cyclic redundancy check (CRC) mask that is different than a second CRC mask associated with parsing DCI received in a physical downlink control channel (PDCCH) or in a downlink data packet that includes a MAC header.

14. The UE of claim 10, wherein one or more time resources allocated to the DCI, one or more frequency resources allocated to the DCI, or both are associated with a different location than one or more time resources, one or more frequency resources, or both, respectively, allocated to a physical downlink control channel (PDCCH).

15. The UE of claim 10, wherein the at least one processor is further configured to receive, from the network entity, one or more remaining minimum system information (RMSI) messages, the one or more RMSI messages indicating one or more time resources allocated for the DCI, one or more frequency resources allocated for the DCI, or both one or more time resources and one or more frequency resources allocated for the DCI, and wherein the one or more RMSI messages further indicate a modulation and coding scheme (MCS) corresponding to the PDSCH.

16. The UE of claim 15, wherein the at least one processor is further configured to:
determine that a synchronization signal block-based reference signal received power (SSB-based RSRP) satisfies a threshold or detect a maximum permissible exposure (MPE) condition; and
initiate transmission, to the network entity, of an indicator of the SSB-based RSRP satisfying the threshold or detection of the MPE condition.

17. The UE of claim 10, wherein the at least one processor is configured to process the DCI based on a modulation and coding scheme (MCS), one or more transmission parameters, or both, that are preconfigured at the UE.

18. The UE of claim 10, wherein the at least one processor is further configured to: initiate transmission, to the network entity, an indicator that a synchronization signal block-based reference signal received power (SSB-based RSRP) satisfies a threshold or that a maximum permissible exposure (MPE) condition is detected, wherein the DCI is received in the PDSCH without any MAC header based on initiation of transmission of the indicator.

19. A method of wireless communication performed by a network entity, the method comprising:
generating downlink control information (DCI);
receiving, from a user equipment (UE), an indication of a synchronization signal block-based reference signal received power (SSB-based RSRP) satisfying a threshold or an indication of a maximum permissible exposure (MPE) condition; and
transmitting, to the UE, a physical downlink shared channel (PDSCH) that includes the DCI based on receipt of the indication of the SSB-based RSRP satisfying the threshold or the indication of the MPE condition, wherein the PDSCH does not include any media access control (MAC) header, and wherein the DCI is included within a media access control-control element (MAC-CE).

20. The method of claim 19, further comprising transmitting, to the UE, one or more remaining minimum system information (RMSI) messages, the one or more RMSI messages indicating one or more time resources allocated for the DCI, one or more frequency resources allocated for the DCI, or both one or more time resources and one or more frequency resources allocated for the DCI.

21. The method of claim 19, wherein determining whether to transmit the PDSCH that includes the DCI and that does not include any MAC headers is further based on a type, a format, or a subset of a physical random access channel (PRACH) or a msgA preamble used to communicate with the UE.

22. The method of claim 19, further comprising transmitting, to the UE, a physical broadcast channel (PBCH), the PBCH including a configuration message, the configuration message indicating one or more time resources allocated for the DCI, one or more frequency resources allocated for the DCI, or both one or more time resources and one or more frequency resources allocated for the DCI.

23. The method of claim 19, further comprising:
transmitting, during configuration of a particular control resource set (CORESET), a first set of transmission parameters corresponding to the DCI and a second set of transmission parameters; and
transmitting a remaining minimum system information (RMSI) physical downlink control channel (PDCCH) to the UE according to the second set of transmission parameters.

24. A network entity comprising:
at least one processor; and
a memory coupled with the at least one processor and storing processor-readable code that, when executed by the at least one processor, is configured to:
generate downlink control information (DCI);
receive, from a user equipment (UE), an indication of a synchronization signal block-based reference signal received power (SSB-based RSRP) satisfying a threshold or an indication of a maximum permissible exposure (MPE) condition; and
initiate transmission, to a user equipment (UE), of a physical downlink shared channel (PDSCH) that includes the DCI based on receipt of the indication of the SSB-based RSRP satisfying the threshold or the indication of the MPE condition, wherein the PDSCH does not include any media access control (MAC) header, and wherein the DCI is included within a media access control-control element (MAC-CE).

25. The network entity of claim 24, wherein the at least one processor is further configured to initiate transmission, to the UE, of one or more remaining minimum system information (RMSI) messages, the one or more RMSI messages indicating one or more time resources allocated for the DCI, one or more frequency resources allocated for the DCI, or both one or more time resources and one or more frequency resources allocated for the DCI.

26. The network entity of claim 24, wherein the at least one processor is configured to determine whether to transmit the PDSCH that includes the DCI and that does not include any MAC headers based further on a type, a format, or a subset of a physical random access channel (PRACH) or a msgA preamble used to communicate with the UE.

27. The network entity of claim 26, wherein the at least one processor is further configured to initiate transmission, to the UE, of a physical broadcast channel (PBCH), the PBCH including a configuration message, the configuration message indicating one or more time resources allocated for the DCI, one or more frequency resources allocated for the DCI, or both one or more time resources and one or more frequency resources allocated for the DCI.

28. The network entity of claim 24, wherein the at least one processor is further configured to:
initiate transmission, during configuration of a particular control resource set (CORESET), of a first set of transmission parameters corresponding to the DCI and a second set of transmission parameters; and
initiate transmission of a remaining minimum system information (RMSI) physical downlink control channel (PDCCH) to the UE according to the second set of transmission parameters.

* * * * *